(No Model.) 2 Sheets—Sheet 1.
I. T. BABBITT.
COMBINED ICE CREAM FREEZER AND CHURN.
No. 527,313. Patented Oct. 9, 1894.
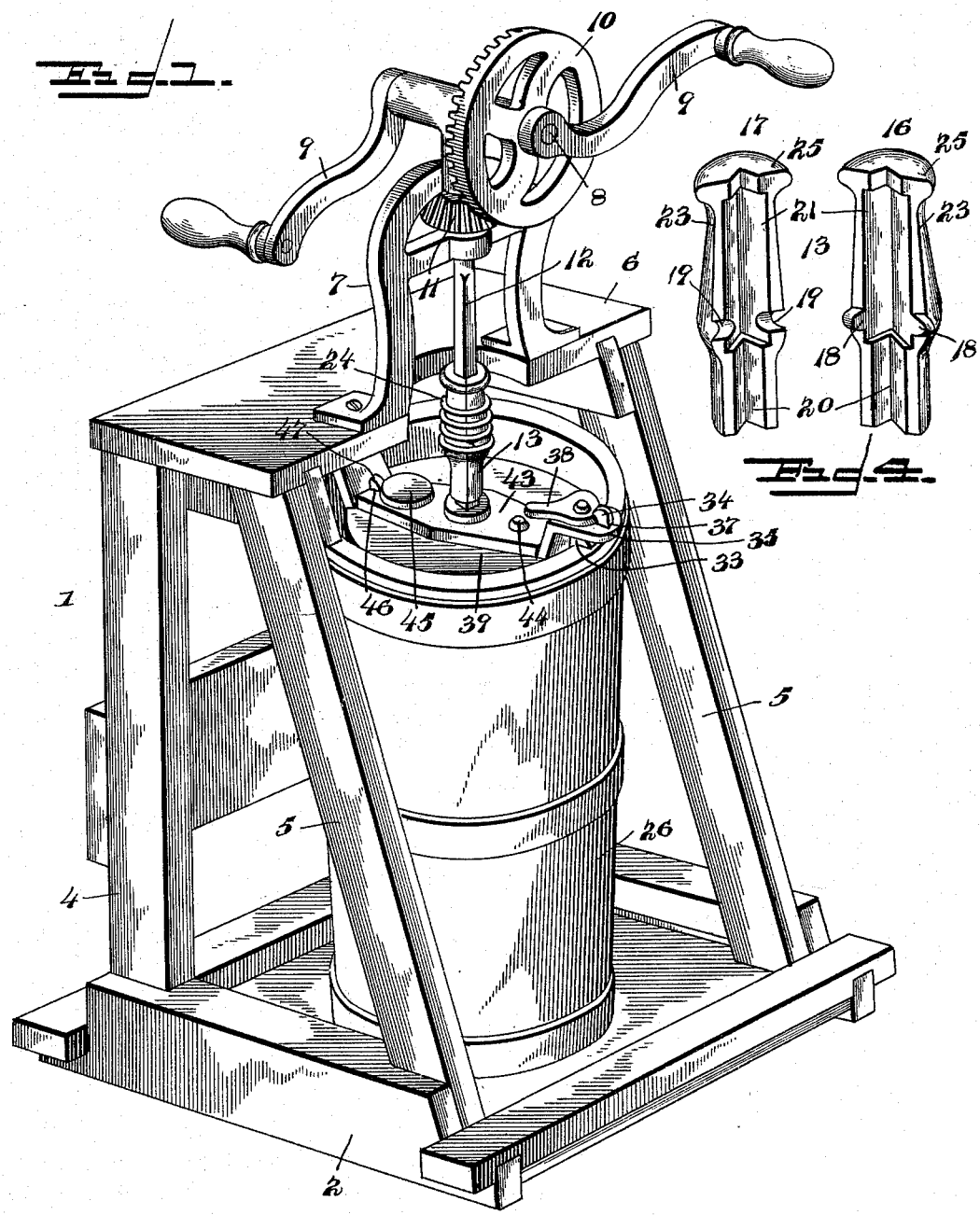
Witnesses
E. K. Stewart
J. F. Riley
Inventor
Ira T. Babbitt
By his Attorneys,
C. A. Snow & Co.

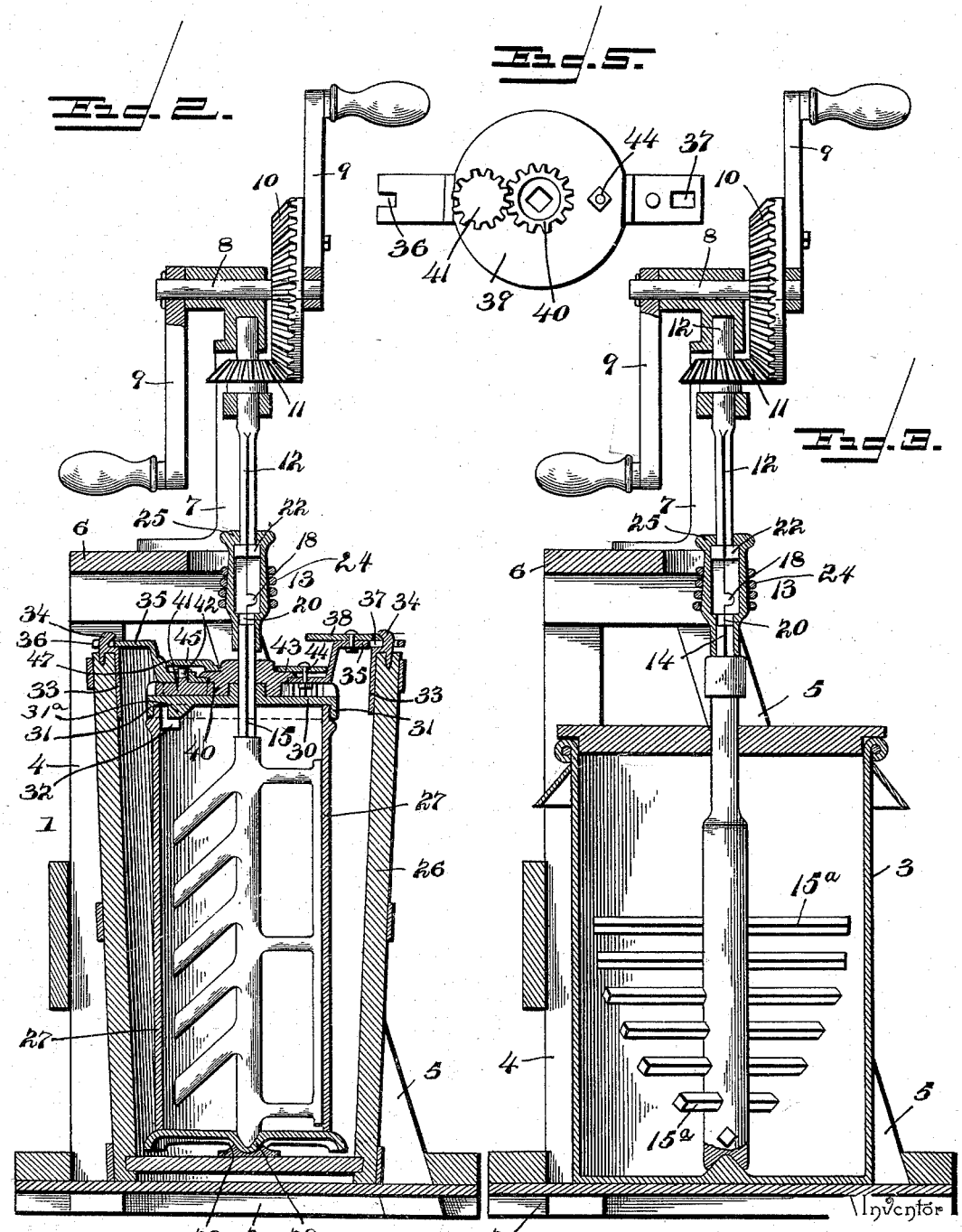

UNITED STATES PATENT OFFICE.

IRA T. BABBITT, OF ABINGDON, ILLINOIS.

COMBINED ICE-CREAM FREEZER AND CHURN.

SPECIFICATION forming part of Letters Patent No. 527,313, dated October 9, 1894.

Application filed April 17, 1894. Serial No. 507,905. (No model.)

*To all whom it may concern:*

Be it known that I, IRA T. BABBITT, a citizen of the United States, residing at Abingdon, in the county of Knox and State of Illinois, have invented a new and useful Combined Ice-Cream Freezer and Churn, of which the following is a specification.

The invention relates to improvements in ice cream freezers and churns.

The object of the present invention is to improve the construction of ice cream freezers and churns, to adapt them to be readily operated by the same mechanism, and to enable them to be readily connected with and removed from the same.

The invention consists in the construction and novel combination and arrangement of parts, hereinafter fully described, illustrated in the accompanying drawings and pointed out in the claims hereto appended.

In the drawings—Figure 1 is a perspective view of an ice cream freezer constructed in accordance with this invention. Fig. 2 is a central vertical sectional view. Fig. 3 is a similar view of a churn. Fig 4 is a detail perspective view of the coupling sleeve, the sections being separated. Fig. 5 is a detail view of the cross-bar of the ice cream freezer, showing the gearing located on the lower face of the same.

Like numerals of reference indicate corresponding parts in all the figures of the drawings.

1 designates a frame, comprising a base 2 adapted to support an ice cream freezer, or a churn body 3, sides, each of which is composed of a vertical bar 4 and an inclined bar 5, and a horizontal top 6, upon which is mounted a bearing bracket 7. The bearing bracket 7 has journaled on it at its top a horizontal shaft 8 provided with opposite crank handles 9, and carrying a cog or gear wheel 10 meshing with a horizontal pinion 11 of a depending vertical shaft 12. The depending vertical shaft 12, which has its upper end journaled in a suitable bearing of the bracket 7, and is fixed or keyed with the cog wheel or pinion 11, is adapted to be readily connected by a coupling sleeve 13 with the dasher shaft 14 of the churn body 3, or to the shaft 15 of the ice cream freezer, whereby the churn or the freezer is operated by rotating the crank handles of the horizontal shaft 8.

The churn body may be of any suitable construction, and the dasher shaft thereof is provided with spirally arranged arms 15$^a$ and the upper end of the dasher shaft 14 is squared or polygonal.

The coupling sleeve 13 is composed of two sections 16 and 17 provided respectively with lugs 18 and notches 19 located intermediate of the ends of the sleeve and interlocking to prevent the sections of the sleeves moving longitudinally on each other. This sleeve is provided with a longitudinal rectangular opening or bore, the lower portion 20 of which forms a socket, and is adapted to receive detachably the upper end of the dasher shaft 14 or the shaft 15 of the ice cream freezer.

The upper portion of the longitudinal opening or bore of the sleeve is enlarged at 21, which enlarged portion extends to within a short distance of the upper end of the sleeve forming upper and lower shoulders, and receiving a head 22 of the lower end of the depending shaft 12, whereby the coupling sleeve is permitted a limited vertical movement on the shaft 12, in order to enable it to fit readily over the polygonal upper ends of the shafts 14 and 15 to detachably connect the churn or the ice cream freezer with the operating mechanism. The exterior surface of the upper portion of the sleeve is slightly conical or tapering at 23 to receive a spiral spring 24, whereby the sections of the sleeve are connected; and the sleeve is provided at its top with an annular flange 25, which retains the spiral spring on the conical or tapering portion 23.

The ice cream freezer comprises an outer receptacle or tub 26 and an inner rotary cream can 27, forming a receptacle for a reversely rotating shaft 15 carrying a vertical scraper and inclined stirring arms. The cream can is provided at its bottom with a depending pivot 28, which rotates on and is supported by a suitable step 29, and the top of the can is provided with a cover or lid 30 having peripheral teeth. The lower face of the cover 30 is provided with a depending flange 31 and a projection 31$^a$, which interlocks with flanges 32 of the cream can, whereby the cover is rigidly connected with the body of the can, and the latter is caused to rotate with it.

The outer receptacle or tub, which contains the freezing mixture, is provided at its upper edge or top at diametrically opposite points with plates 33 having upward extending lugs 34, adapted to detachably interlock with a cross-bar 35. The cross-bar 35 is provided at one end with a notch or recess 36, which engages one of the lugs, and at its opposite end with an opening 37 to receive the other lug, which is engaged by a pivoted cam lever 38 adapted to securely lock the cross-bar in operative position.

The cross-bar is provided with a depressed circular portion 39 having a central bearing opening receiving a gear wheel, which is provided with a polygonal opening, whereby it is fixed to the shaft 15; and the gear wheel 40 meshes with a pinion 41 which in turn meshes with the peripheral teeth of the cover of the cream can, whereby the cream can and the shaft are reversely rotated. The pinion is provided with an upward extending journal 42 arranged in a bearing opening of the circular depressed portion 39, and secured to the same by a split key.

The gear wheel 40 is secured detachably to the cross-bar by a plate 43 having depending longitudinal flanges and forming a casing for housing the journal of the pinion 41 and the upper portion of the gear wheel 40. It is secured to the circular depressed portion by a bolt 44, and is provided at one end, which has a circular raised portion, 45, with a notch 46, which engages a projection 47 of the adjacent upward extending side of the depressed portion of the cross-bar.

It will readily be seen that either the churn or the ice cream freezer mechanism may be readily arranged in the frame and quickly connected with the operating mechanism thereof, and that either butter or ice cream may be readily produced.

Changes in the form, proportion, and the minor details of construction may be resorted to without departing from the principle or sacrificing any of the advantages of this invention.

What I claim is—

1. The combination of a frame, a vertical shaft journaled thereon and provided at its lower end with a polygonal head, gearing for rotating the shaft, a coupling sleeve composed of sections and having the lower portion of its longitudinal opening forming a socket adapted to receive the shaft of a churn or ice cream freezer, the upper portion of said longitudinal opening being enlarged, forming upper and lower shoulders and receiving the head of the vertical shaft, whereby the coupling sleeve is permitted a limited vertical movement, and means for connecting the sections of the sleeves, substantially as described.

2. The combination of a frame, a vertical shaft journaled thereon and provided at its lower end with a polygonal head, gearing for rotating the shaft, a coupling sleeve having an upper exterior conical portion and composed of sections, the lower portion of its longitudinal opening forming a socket to receive detachably the shaft of an ice cream freezer or churn and the upper portion of the opening being enlarged and receiving the head of the vertical shaft, and a spiral spring arranged on the conical portion of the sleeve and connecting the sections thereof, substantially as described.

3. The combination of a frame, a vertical shaft journaled thereon, gearing for rotating the shaft, a coupling sleeve carried by the shaft and provided at its lower end with a socket, an outer receptacle mounted on the frame, an inner rotary cream can arranged within the outer receptacle and provided with a cover having peripheral teeth, a cross-bar detachably secured to the top of the outer receptacle and having a central depressed circular portion provided with a central opening and a side bearing opening, a shaft arranged in the cream can and extending upward to the cover thereof, a gear wheel arranged in the central opening of the cross-bar and fixed to the shaft of the cream can, a pinion meshing with the gear wheel and the peripheral teeth of the can and provided with a pinion journaled in the side bearing opening of the cross-bar, and a plate arranged on the central depressed portion of the cross-bar and having one end bolted thereto and provided with depending longitudinal flanges to form a casing and provided at its opposite ends with a notch engaging a projection of the adjacent portion of the cross-bar, substantially as described.

In testimony that I claim the foregoing as my own I have hereto affixed my signature in the presence of two witnesses.

IRA T. BABBITT.

Witnesses:
JOHN M. CALLISON,
WM. C. HOOKER.